United States Patent
Zhong et al.

(10) Patent No.: US 10,627,584 B2
(45) Date of Patent: Apr. 21, 2020

(54) CONNECTOR

(71) Applicant: Tyco Electronics (Shanghai) Co. Ltd., Shanghai (CN)

(72) Inventors: Zhiyun Zhong, Shanghai (CN); Zhigang Song, Shanghai (CN); Haibo Zhang, Shanghai (CN); Jiangbo Qin, Shanghai (CN); Jinqiang Zhang, Shanghai (CN); Jiahui Chen, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 9 days.

(21) Appl. No.: 15/674,029

(22) Filed: Aug. 10, 2017

(65) Prior Publication Data

US 2018/0045900 A1 Feb. 15, 2018

(30) Foreign Application Priority Data

Aug. 10, 2016 (CN) .......................... 2016 1 0649852

(51) Int. Cl.
  *G02B 6/38* (2006.01)
  *G02B 6/40* (2006.01)
  *G02B 6/32* (2006.01)

(52) U.S. Cl.
  CPC ......... *G02B 6/3887* (2013.01); *G02B 6/3853* (2013.01); *G02B 6/3869* (2013.01); *G02B 6/3878* (2013.01); *G02B 6/3879* (2013.01); *G02B 6/32* (2013.01); *G02B 6/3821* (2013.01); *G02B 6/403* (2013.01)

(58) Field of Classification Search
  CPC .. G02B 6/3887; G02B 6/3869; G02B 6/3853; G02B 6/3879; G02B 6/3878; G02B 6/403; G02B 6/3821; G02B 6/32; G02B 6/389; G02B 6/3871
  See application file for complete search history.

(56) References Cited

U.S. PATENT DOCUMENTS 3,633,250 A * 1/1972 Romney ................. A47F 7/163
  16/387
4,645,296 A * 2/1987 Cattin .................. G02B 6/3803
  385/137

(Continued)

FOREIGN PATENT DOCUMENTS

WO WO 2015121791 A3 * 12/2015 ........... G02B 6/3821

*Primary Examiner* — Ryan A Lepisto
*Assistant Examiner* — Erin D Chiem
(74) *Attorney, Agent, or Firm* — Barley Snyder

(57) ABSTRACT

A connector that includes an outer housing having an assembly channel with a stopping step on an inner wall of thereof and an optical beam expanding module assembled with the assembly channel of the outer housing. The optical beam expanding module includes a rear seat, formed with a snap ring groove, in which a C-shaped snap ring is fitted. A cable having a strengthening element is fixed on a rear end portion of the rear seat. When the cable of the optical beam expanding module is pulled outwardly, the C-shaped snap ring abuts against the stopping step, so that a pulling force exerted on the cable is transferred to the outer housing through the strengthening element of the cable, instead of being transferred to an optical fiber of the cable, thus preventing the optoelectronic coupling end faces of the connector from being separated.

20 Claims, 6 Drawing Sheets

(56) References Cited

U.S. PATENT DOCUMENTS

| | | | | |
|---|---|---|---|---|
| 4,786,135 A * | 11/1988 | Boero | G02B 6/32 | 385/59 |
| 4,846,544 A * | 7/1989 | Bortolin | G02B 6/25 | 385/84 |
| 4,889,399 A * | 12/1989 | Mariani | G02B 6/32 | 385/35 |
| 4,895,425 A * | 1/1990 | Iwano | G02B 6/3817 | 385/60 |
| 5,838,857 A * | 11/1998 | Niekrasz | G02B 6/3816 | 385/56 |
| 8,556,521 B2 * | 10/2013 | Everett | G02B 6/3807 | 385/62 |
| 8,824,841 B1 * | 9/2014 | Mullen | G02B 6/32 | 29/428 |
| 9,519,108 B1 * | 12/2016 | Guiffault | G02B 6/322 | |
| 2003/0174939 A1 * | 9/2003 | Moon | G02B 6/262 | 385/27 |
| 2010/0290754 A1 * | 11/2010 | Yamauchi | G02B 6/3887 | 385/137 |
| 2013/0011102 A1 * | 1/2013 | Rinzler | G02B 6/3813 | 385/89 |
| 2013/0028569 A1 * | 1/2013 | Kempeneers | G02B 6/4471 | 385/139 |
| 2014/0294395 A1 * | 10/2014 | Waldron | G02B 6/3823 | 398/115 |

* cited by examiner

CONNECTOR

CROSS-REFERENCE TO RELATED APPLICATION

This application claims the benefit of the filing date under 35 U.S.C. § 119(a)-(d) of Chinese Patent Application No. CN201610649852.2 filed on Aug. 10, 2016.

FIELD OF THE INVENTION

Embodiments of the present invention generally relate to a connector and, more particularly, to an optical beam expanding connector having good anti-pulling capacity.

BACKGROUND

In the prior art, an optical beam expanding connector typically includes a mounting body and a plurality of beam expanding functional components. A mounting hole is formed in the mounting body, with the plurality of beam expanding functional components being mounted therein. Generally, the plurality of beam expanding functional components mainly includes a ferrule, an optical fiber, a lens, and a centering component. The optical fiber is accommodated in an inner hole of the ferrule. The ferrule is mounted in the mounting hole of the mounting body. The lens is mounted in the mounting hole of the mounting body and arranged at the front end face of the ferrule so as to expand the diameter of the light beam output from the optical fiber. The centering component is mounted on the ferrule so as to align the axis of the ferrule with the axis of the mounting hole.

In the prior art, each beam expanding functional component of the optical beam expanding connector is mounted directly in the mounting hole of the mounting body of the connector. Thus, it is necessary that the internal structure of the mounting hole conform to the shape of each beam expanding functional component to be mounted.

At present, there is no uniform industry standard for design of the optical beam expanding connector. Therefore, internal structures of the mounting holes in different series of optical beam expanding connectors are usually different from each other. Therefore, it is necessary to separately design and manufacture beam expanding functional components that conform to the internal structure of the mounting holes and beam expanding functional components of different series of optical beam expanding connectors are not interchangeable. Thus, it is necessary to separately design and manufacture dedicated beam expanding functional components for different series of optical beam expanding connectors, which may waste lots of labor and material and may lead to a long development cycle.

In addition, in the prior art, a strong spring is usually provided in the mounting hole of the mounting body and when the cable in the connector is pulled outwardly, the strong spring is compressed so as to provide a corresponding reaction force to prevent the optical fiber of the cable from being pulled, thus preventing the optoelectronic coupling end faces of the connector from being separated.

However, such an anti-pulling solution has the following defects: limited anti-pulling capacity which is generally less than 20N, larger volume of the strong spring for anti-pulling, resulting in difficult miniaturization for the connector, and complex structure of the connector.

SUMMARY

A connector, constructed in accordance with the present invention, includes an outer housing, an optical beam expanding module, and a C-shaped snap ring. The outer housing has an assembly channel with a stopping step on an inner wall of the assembly channel. The optical beam expanding module is in the assembly channel of the outer housing and has a rear seat having a rear end portion and snap ring groove and a cable having a strengthening element fixed to a rear end portion of the rear seat. The C-shaped snap ring is fitted in the snap groove of the rear seat and abuts against the stopping step when the cable of the optical beam expanding module is pulled outwardly, so that a pulling force exerted on the cable is transferred to the outer housing through the strengthening element of the cable.

BRIEF DESCRIPTION OF THE DRAWINGS

The above and other features of the present disclosure will be described with reference to the accompanying drawings, in which:

FIGS. 5A to 5D show assembling a connector according to an embodiment of the present invention, wherein, FIG. 5A shows insertion of the optical beam expanding module shown in FIG. 1 from the rear side of the outer housing into the assembly channel of the outer housing; FIG. 5B shows that the optical beam expanding module, having been inserted into the assembly channel, is pulled out from the front side of the outer housing and the C-shaped snap ring is mounted in the snap ring groove of the rear seat of the optical beam expanding module;

FIG. 5C shows installation of a centering nut on the front end portion of the inner housing of the optical beam expanding module; and FIG. 5D shows that the optical beam expanding module has been assembled in the assembly channel of the connector.

DETAILED DESCRIPTION OF THE PREFERRED EMBODIMENTS

Figure 1:
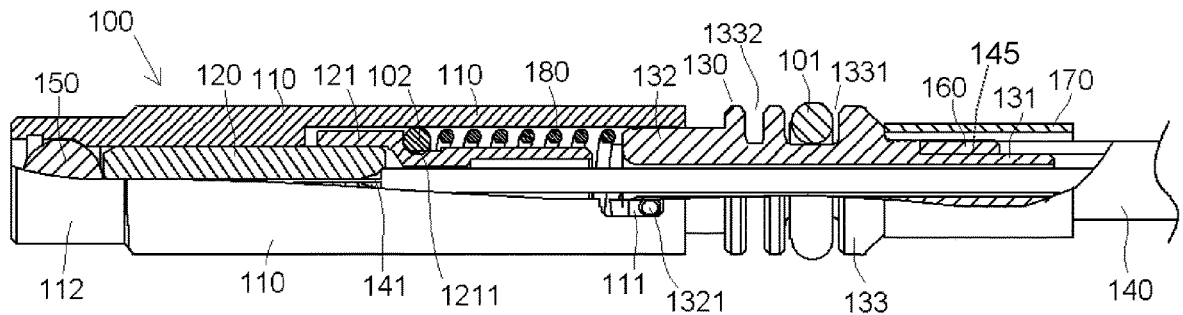
FIG. 1 shows an assembled optical beam expanding module according to an embodiment of the present invention.
Figure 2:
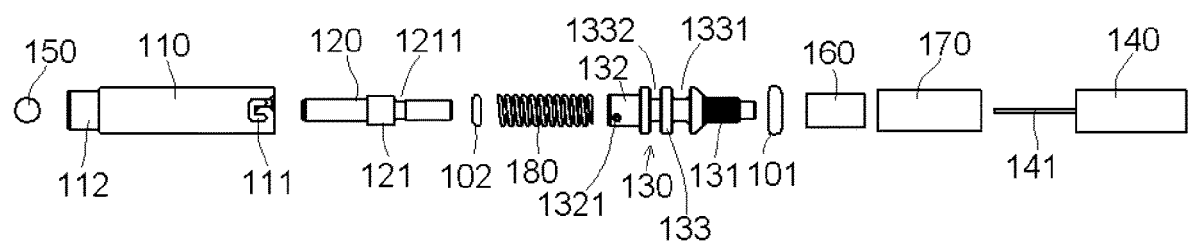
FIG. 2 is an exploded view of an optical beam expanding module according to an embodiment of the present invention.

The present invention will be described in further detail with reference to the following embodiments, taken in conjunction with the accompanying drawings. In the specification, the same or similar reference numerals indicate the same or similar components. The following description of embodiments of the present invention with reference to the accompanying drawings is intended to explain the general inventive concept of the present invention and should not be construed as limiting the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As shown in FIGS. 1 to 4, in the illustrated embodiment of the present invention, the optical beam expanding connector mainly comprises an outer housing 200 and an optical beam expanding module 100. One or more assembly channels 201 are provided in the outer housing 200, with the optical beam expanding module being assembled in the assembly channel of the outer housing 200.

The optical beam expanding module 100 comprises a rear seat 130 and a cable 140 and a strengthening element 145 (such as Kevlar fiber or a reinforcing rib) of the cable 140 is fixed on a rear end portion 131 of the rear seat 130.

A snap ring groove 1332 is formed in the rear seat 130 and a C-shaped snap ring 230 is fitted in the snap ring groove 1332. A stopping step 221 is formed on an inner wall of the assembly channel 201 of the outer housing 200.

Figure 4:
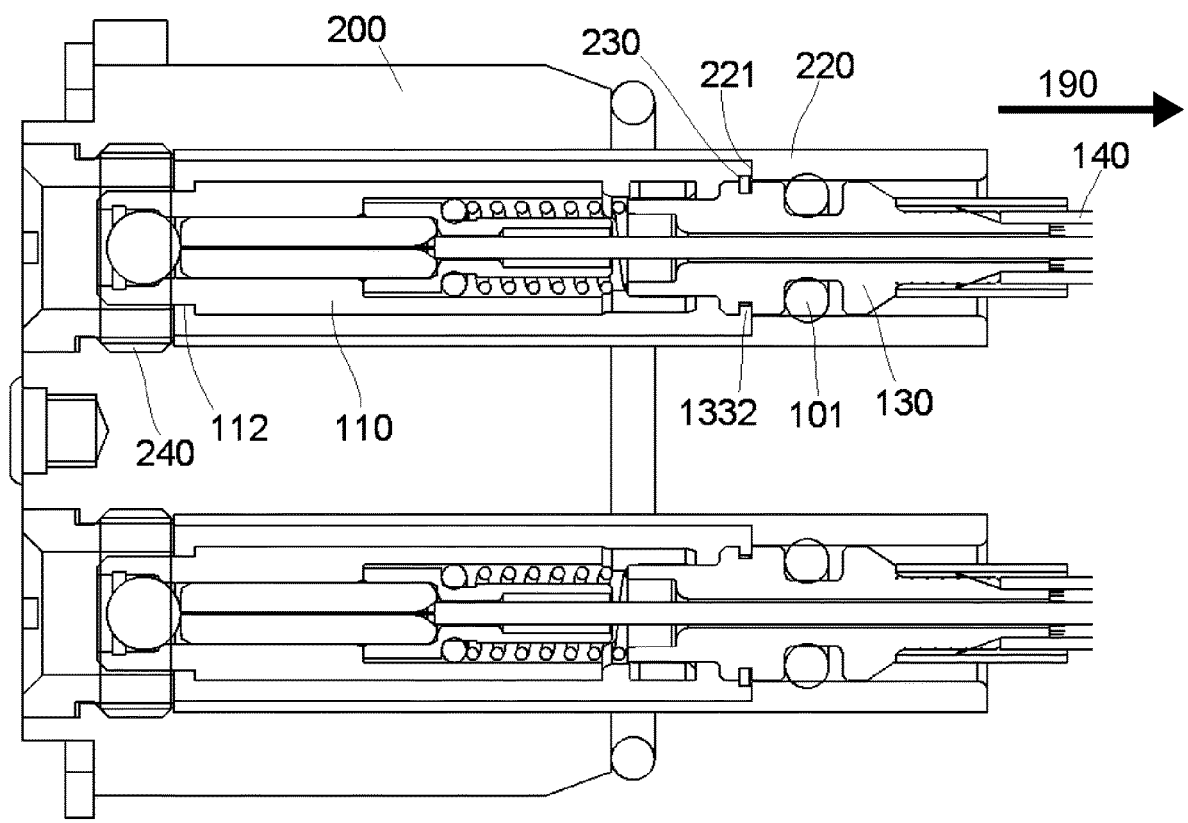
FIG. 4 shows an assembled connector according to an embodiment of the present invention.

As shown in FIG. 4, in the illustrated embodiment of the present invention, when the cable 140 of the optical beam expanding module 100 is pulled outwardly, the C-shaped snap ring 230 abuts against the stopping step 221, so that a pulling force 190 exerted on the cable 140 is transferred to the outer housing 200 through the strengthening element 145 of the cable 140, instead of being transferred to an optical fiber 141 of the cable 140.

As shown in FIGS. 1 to 4, in the illustrated embodiment of the present invention, the optical beam expanding module 100 further comprises: an inner housing 110; a ferrule 120 mounted in the inner housing 110; and an optical lens 150 mounted in the inner housing 110 and located at a front end surface of the ferrule 120. A front end portion 132 of the rear seat 130 is connected to the rear end of the inner housing 110 and the fiber 141 of the cable 140 passes through the rear seat 130 and is received in an inner bore of the ferrule 120. The diameter of a light beam emitted from the optical fiber 141 is expanded by the optical lens 150.

Two assembly channels 201 are formed in the outer housing 200, with each assembly channel 201 being assembled with one optical beam expanding module 100.

The front end portion 132 of the rear seat 130 is adapted to be snapped to or screwed to (i.e., fastened) the rear end of the inner housing 110.

A slot 111 is formed in one of the front end portion 132 of the rear seat 130 and the rear end of the inner housing 110 and a projection 1321 adapted to be snapped into the slot 111 is formed on the other.

The optical beam expanding module 100 further comprises a crimp ring 160 fitted on the rear end portion 131 of the rear seat 130, the crimp ring 160 being adapted to crimp the strengthening element 145 of the cable 140 against the rear end portion 131 of the rear seat 130.

The optical beam expanding module 100 further comprises a first seal ring 101 fitted on the rear seat 130, the first seal ring 101 being adapted to be pressed between an inner wall of the assembly channel 201 and an outer wall of the rear seat 130 for sealing a mating interface between the rear seat 130 and the assembly channel 201.

The rear seat 130 comprises a projection portion 133 located between the front end portion 132 and the rear end portion 131 thereof and a first circular groove 1331 is formed in the projection portion 133, with the first sealing ring 101 being received in the first circular groove 1331. As is clearly shown in the FIGS. 1 and 2, the snap ring groove 1332 is formed in the projection portion 133 of the rear seat 130 and is located in front of the first circular groove 1331.

As shown in FIGS. 1 to 4, in the illustrated embodiment of the present invention, the optical beam expanding module 100 further comprises a second seal ring 102 fitted on the ferrule 120, the second seal ring 102 being adapted to be pressed between an inner wall of the inner housing 110 and an outer wall of the ferrule 120 for sealing a mating interface between the inner housing 110 and the ferrule 120.

A second circular groove 1211 is formed on a rear seat 121 of the ferrule 120, with the second seal ring 102 being received in the second circular groove 1211.

The optical beam expanding module 100 further comprises a spring 180 received in the inner housing 110 and compressed between the rear seat 130 and the ferrule 120 for applying axial thrust to the ferrule 120 such that the front end face of the ferrule 120 is pushed against the optical lens 150.

The optical beam expanding module 100 further comprises a thermal shrinkable tube 170 thermally shrunk onto the rear end portion 131 of the rear seat 130 and the cable 140.

The optical lens 150 comprises a spherical optical lens.

The connector further comprises a centering nut 240 fitted on a front end portion 112 of the inner housing 110 and screwed to the assembly channel 201 so that the axis of the ferrule 120 is aligned with the axis of the assembly channel 201.

Figure 3:
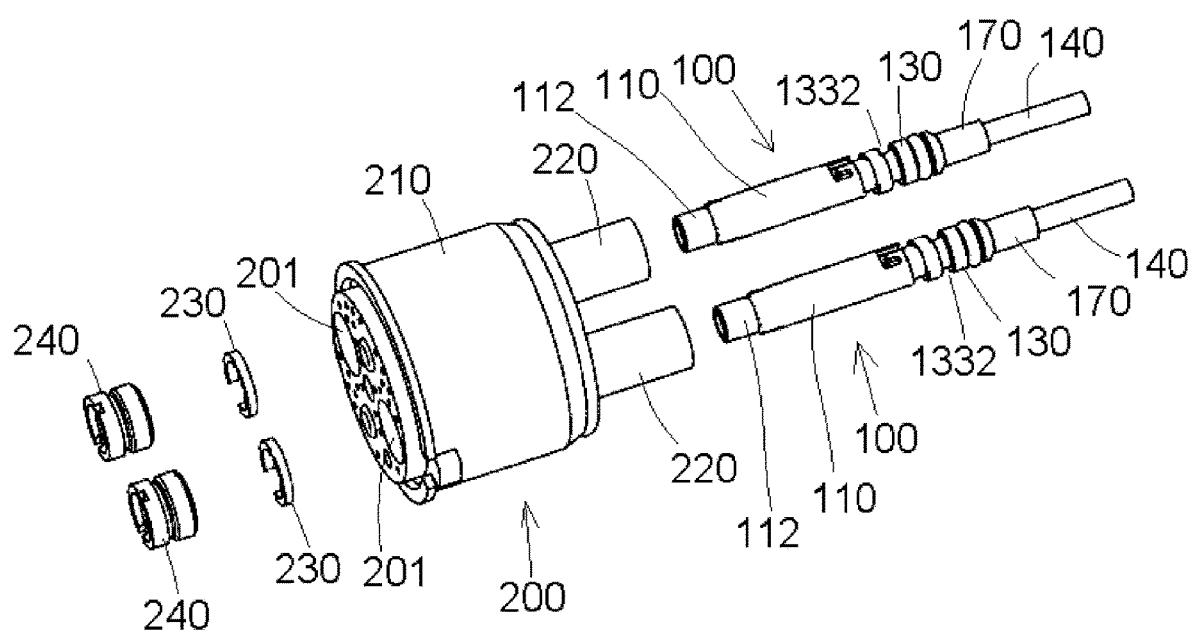
FIG. 3 is an exploded view of a connector according to an embodiment of the present invention.

As shown in FIGS. 3 and 4, in the illustrated embodiment of the present invention, the outer housing 200 comprises a body portion 210 and a tubular tail portion 220 extending from the rear side of the body portion 210, with the assembly channel 201 extending through the body portion 210 and the tubular tail portion 220.

The stopping step 221 is formed on the inner wall of the tubular tail portion 220 of the outer housing 200, such that the optical beam expanding module 100 is adapted to be inserted into the assembly channel 201 of the outer housing 200 from the rear side of the outer housing 200 and positioned in the assembly channel 201 through engagement of the stopping step 221 and the C-shaped snap ring 230 mounted in the snap ring groove 1332 of the rear seat 130 of the optical beam expanding module 100.

The above described optical beam expanding module 100 comprises a standardized function module adapted to be inserted into different assembly channels of the same connector or adapted to be inserted into assembly channels of different connectors.

FIGS. 5A to 5D show assembling a connector according to an embodiment of the present invention. Operations of assembling the optical beam expanding module 100 to the assembly channel 201 of the outer housing 200 will be described below with reference to FIGS. 5A to 5D.

Figure 5A:
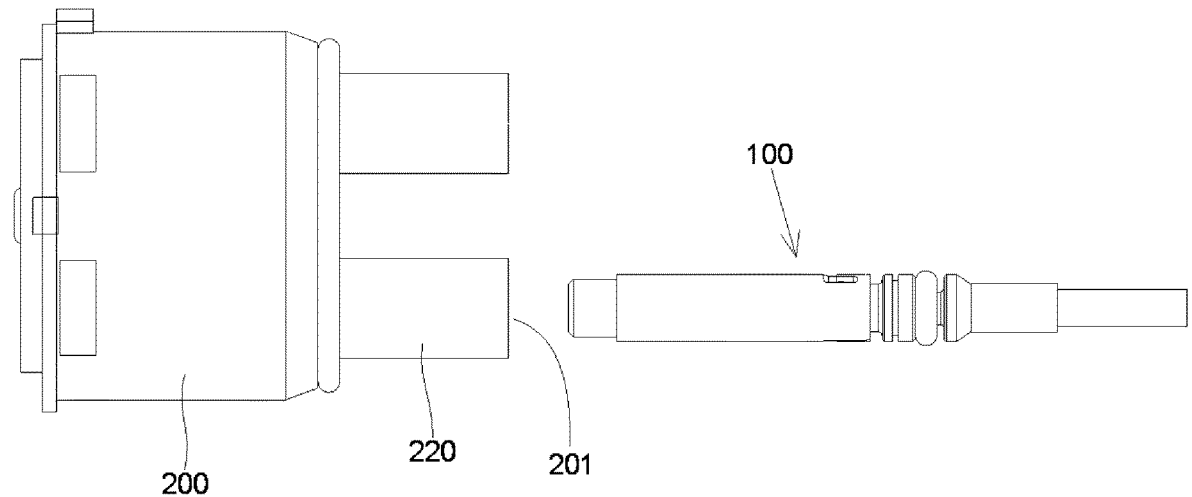
Figure 5B:
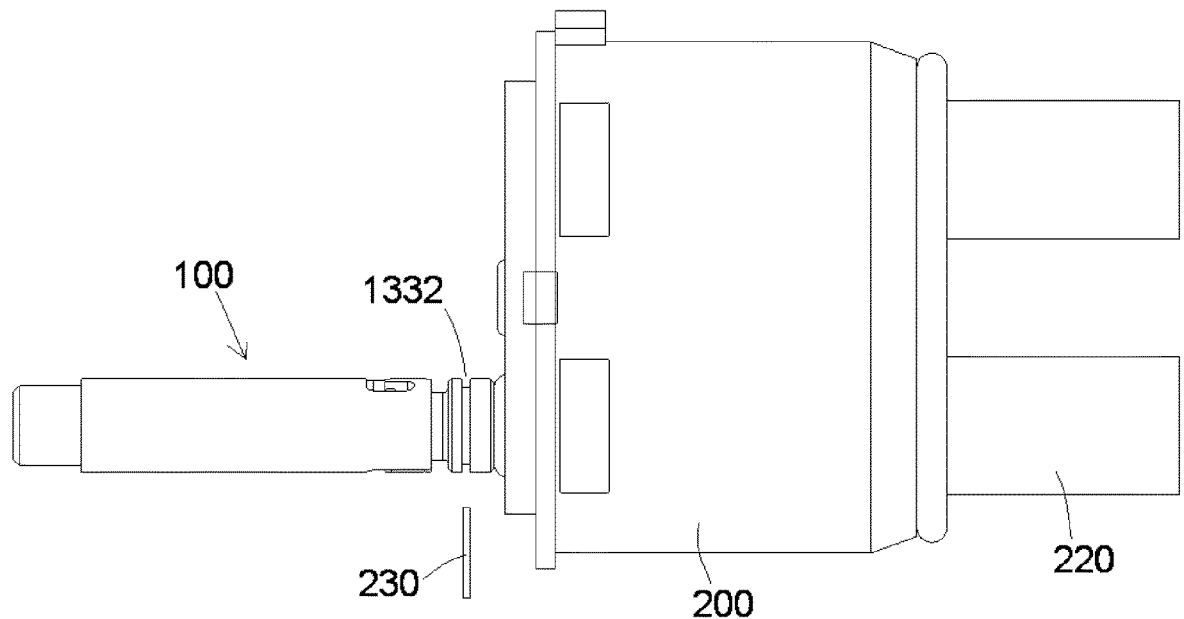
Figure 5C:
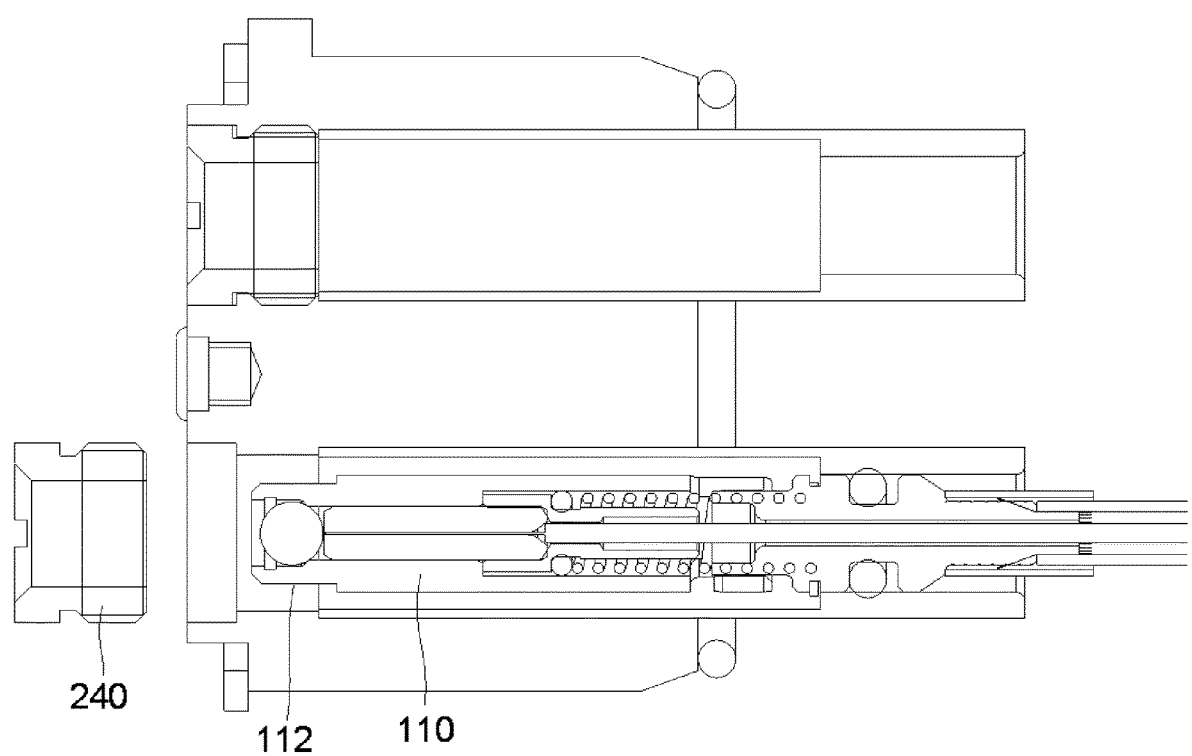
Figure 5D:
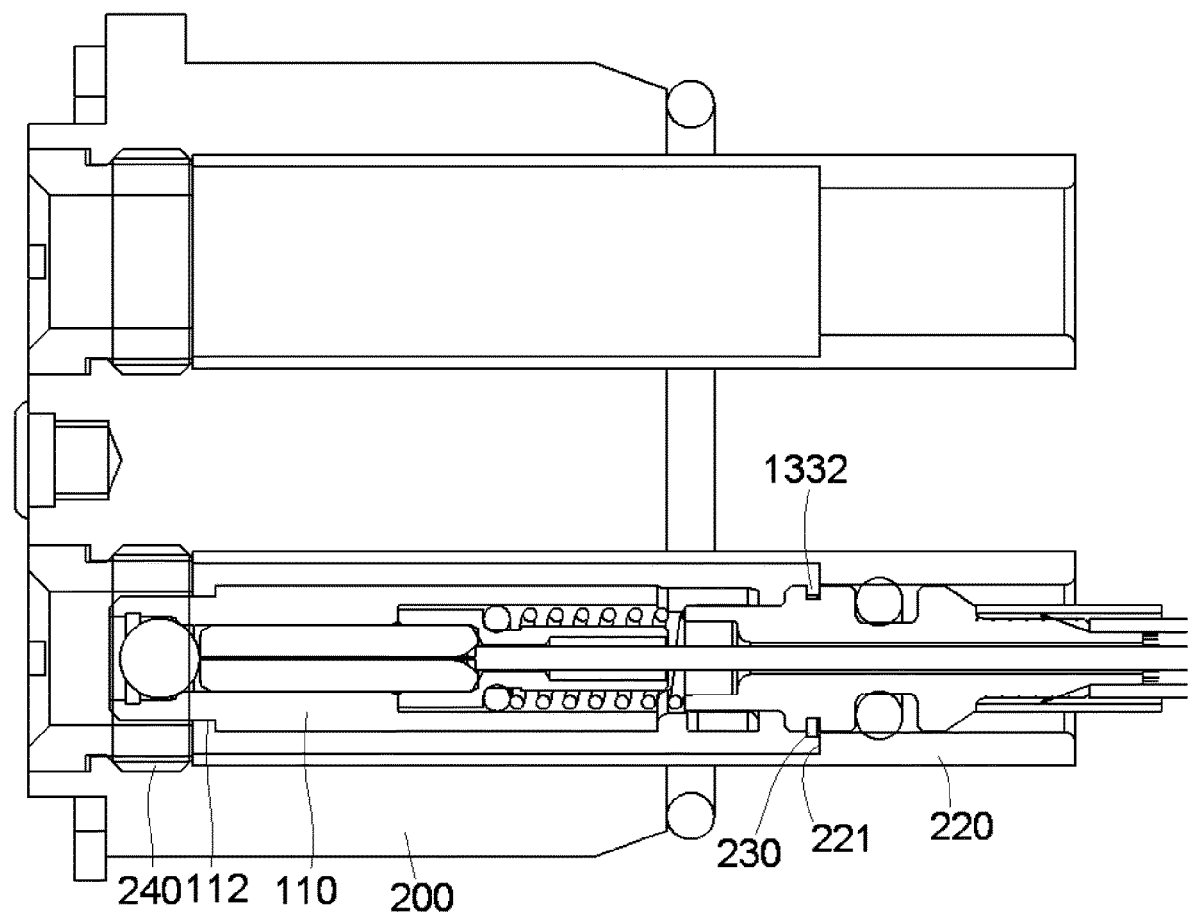

First, as shown in FIG. 5A, the optical beam expanding module 100 shown in FIG. 1 is assembled into the assembly channel 201 of the outer housing 200 from the rear side of the outer casing 200;

Then, as shown in FIG. 5B, the optical beam expanding module 100 inserted into the assembly channel 201 is pulled out from the front side of the outer housing 200 and the C-shaped snap ring 230 is mounted in the snap ring groove 1332 of the rear seat 130 of the optical beam expanding module 100;

Then, as shown in FIG. 5C, the centering nut 240 is mounted on the front end portion 112 of the inner housing 110 of the optical beam expanding module 100 Thus, as shown in FIG. 5D, the optical beam expanding module 100 is assembled in the assembly channel 201 of the connector.

It should be appreciated by those skilled in this art that the above embodiments are intended to be illustrative. Many modifications may be made to the above embodiments by those skilled in this art and various features described in different embodiments may be freely combined with each other without conflicting in configuration or principle, to realize a variety of connection terminals and electrical connectors on the basis that the technical problems of the present disclosure are solved.

Although the present disclosure has been described with reference to the accompanying drawings, the embodiments disclosed in the drawings are intended to be illustrative of the preferred embodiments of the invention and are not to be construed as limiting the invention.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

It should be noted that the terms "comprises" and/or "comprising" in this specification do not exclude other elements or steps and the singular forms "a", "an" and "the" are intended to include the plural forms as well.

What is claimed is:

1. A connector comprising
   an outer housing having an assembly channel with a stopping step on an inner wall of the assembly channel;
   an optical beam expanding module in the assembly channel of the outer housing having:
   (a) a rear seat having a rear end portion and snap ring groove, and
   (b) a cable having a strengthening element fixed to a rear end portion of the rear seat; and
   a C-shaped snap ring fitted in the snap groove of the rear seat and abutting against the stopping step when the cable of the optical beam expanding module is pulled outwardly, so that a pulling force exerted on the cable is transferred to the outer housing through the strengthening element of the cable.

2. The connector according to claim 1, wherein:
   (a) the cable has an optical fiber passing through the rear seat,
   (b) the optical beam expanding module further comprises:
      (1) an inner housing,
      (2) a ferrule mounted in the inner housing and having an inner bore that receives the fiber of the cable, and
      (3) an optical lens mounted in the inner housing at a front end surface of the ferrule that expands the diameter of a light beam emitted from the optical fiber, and
   (c) a front end portion of the rear seat is connected to the rear end of the inner housing.

3. The connector according to claim 2, wherein the outer housing has at least one assembly channel assembled with an optical beam expanding module.

4. The connector according to claim 2, wherein the optical beam expanding module further comprises a crimp ring that presses the strengthening element of the cable against the rear end portion of the rear seat.

5. The connector according to claim 4, wherein the optical beam expanding module further comprises a thermal shrinkable tube thermally shrunk onto the rear end portion of the rear seat and the cable.

6. The connector according to claim 2, wherein the optical beam expanding module further comprises a spring received in the inner housing and compressed between the rear seat and the ferrule for applying axial thrust to the ferrule such that the front end surface of the ferrule is pushed against the optical lens.

7. The connector according to claim 2, further comprising a centering nut fitted on a front end portion of the inner housing and screwed to the assembly channel to align the axis of the ferrule with the axis of the assembly channel.

8. The connector according to claim 1, wherein the optical lens comprises a spherical optical lens.

9. The connector according to claim 1, wherein the outer housing comprises a body portion and a tubular tail portion extending from a rear side of the body portion and the assembly channel extends through the body portion and the tubular tail portion.

10. The connector according to claim 1, wherein the optical beam expanding module comprises a standardized function module adapted to be inserted into different assembly channels of the same connector or adapted to be inserted into assembly channels of different connectors.

11. A connector comprising:
    an outer housing having an assembly channel with a stopping step on an inner wall of the assembly channel;
    an optical beam expanding module in the assembly channel of the outer housing having:
    (a) a rear seat having a rear end portion, a front end portion and snap ring groove,
    (b) a cable having an optical fiber passing through the rear seat and a strengthening element fixed to a rear end portion of the rear seat,
    (c) an inner housing and the front end portion fastened to the rear end of the inner housing,
    (d) a ferrule mounted in the inner housing and having an inner bore that receives the fiber of the cable, and
    (e) an optical lens mounted in the inner housing at a front end surface of the ferrule that expands the diameter of a light beam emitted from the optical fiber; and
    a C-shaped snap ring fitted in the snap groove of the rear seat and abutting against the stopping step when the cable of the optical beam expanding module is pulled outwardly, so that a pulling force exerted on the cable is transferred to the outer housing through the strengthening element of the cable.

12. A connector comprising:
    an outer housing having:
    (a) body portion,
    (b) a tubular tail portion extending from a rear side of the body portion, and
    (c) an assembly channel:
       (1) having a stopping step on an inner wall of the tubular tail portion of the assembly channel, and
       (2) extending through the body portion and the tubular tail portion;
    an optical beam expanding module in the assembly channel of the outer housing and having:
    (a) a rear seat having a rear end portion and snap ring groove, and
    (b) a cable having a strengthening element fixed to a rear end portion of the rear seat; and
    a C-shaped snap ring fitted in the snap groove of the rear seat of the optical beam expanding module and abutting against the stopping step of the assembly channel of the outer housing when the cable of the optical beam expanding module is pulled outwardly, so that a pulling force exerted on the cable is transferred to the outer housing through the strengthening element of the cable.

13. The connector according to claim 12, wherein the optical beam expanding module is inserted into the assembly channel of the outer housing from the rear side of the outer housing.

14. A connector comprising
    an outer housing having an assembly channel with a stopping step on an inner wall of the assembly channel;

an optical beam expanding module in the assembly channel of the outer housing and having:
- (a) a rear seat having a rear end portion and snap ring groove,
- (b) a cable having:
  - (1) a strengthening element fixed to the rear end portion of the rear seat, and
  - (2) an optical fiber passing through the rear seat,
- (c) an inner housing,
- (d) a ferrule mounted in the inner housing of the optical beam expanding module and having an inner bore that receives the optical fiber of the cable,
- (e) an optical lens mounted in the inner housing the optical beam expanding module at a front end surface of the ferrule the optical beam expanding module that expands the diameter of a light beam emitted from the optical fiber of the cable, and
- (f) a front end portion of the rear seat of the optical beam expanding module connected to the rear end of the rear seat of the optical beam expanding module; and a C-shaped snap ring fitted in the snap groove of the rear seat of the optical beam expanding module and abutting against the stopping step of the outer housing when the cable of the optical beam expanding module is pulled outwardly, so that a pulling force exerted on the cable is transferred to the outer housing through the strengthening element of the cable.

15. The connector according to claim 14, wherein:
- (a) One of the front end portion of the rear seat and the rear end of the inner housing has a slot, and
- (b) the other of the front end portion of the rear seat and the rear end of the inner housing has a projection snapped into the slot.

16. The connector according to claim 14, wherein the optical beam expanding module further comprises a first seal ring pressed between an inner wall of the assembly channel and an outer wall of the rear seat for sealing a mating interface between the rear seat and the assembly channel.

17. The connector according to claim 16, wherein the rear seat has a projection portion between the front end portion and the rear end portion and the projection portion has a first circular groove in which the first sealing ring is received.

18. The connector according to claim 17, wherein the snap ring groove is in the projection portion of the rear seat in front of the first circular groove.

19. The connector according to claim 16, wherein the optical beam expanding module further comprises a second seal ring pressed between an inner wall of the inner housing and an outer wall of the ferrule for sealing a mating interface between the inner housing and the ferrule.

20. The connector according to claim 19, wherein the ferrule has a second circular groove in a rear seat of the ferrule in which the second seal ring is received.

* * * * *